US010012348B2

(12) United States Patent
Ray et al.

(10) Patent No.: US 10,012,348 B2
(45) Date of Patent: Jul. 3, 2018

(54) ALTERNATIVE CORE MATERIAL BASED VACUUM INSULATED PANELS

(71) Applicant: UNITED STATES GYPSUM COMPANY, Chicago, IL (US)

(72) Inventors: Suman Sinha Ray, Chicago, IL (US); Ajith Rao, Gurnee, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 30 days.

(21) Appl. No.: 15/040,413

(22) Filed: Feb. 10, 2016

(65) Prior Publication Data

US 2017/0227165 A1 Aug. 10, 2017

(51) Int. Cl.
| | |
|---|---|
| *F16L 59/065* | (2006.01) |
| *F17C 3/08* | (2006.01) |
| *B29C 70/58* | (2006.01) |
| *B29C 70/88* | (2006.01) |
| *E04C 2/284* | (2006.01) |
| *E04C 2/30* | (2006.01) |
| *E04B 2/00* | (2006.01) |
| *B29K 105/00* | (2006.01) |

(Continued)

(52) U.S. Cl.
CPC ............. *F17C 3/08* (2013.01); *B29C 70/58* (2013.01); *B29C 70/88* (2013.01); *E04C 2/284* (2013.01); *E04C 2/30* (2013.01); *E04C 2/44* (2013.01); *B29K 2105/04* (2013.01); *B29K 2105/16* (2013.01); *B29K 2105/251* (2013.01); *B29L 2031/776* (2013.01)

(58) Field of Classification Search
CPC ............... F16L 59/065; E04B 1/803

USPC .......................................................... 428/69
See application file for complete search history.

(56) References Cited

U.S. PATENT DOCUMENTS 3,769,770 A 11/1973 Deschamps et al.
4,492,725 A 1/1985 Ishihara et al.
(Continued)

FOREIGN PATENT DOCUMENTS

EP 2562207 A1 2/2013
JP 2012136890 A 7/2012
(Continued)

OTHER PUBLICATIONS

International Search Report for International Application No. PCT/US2017/016464, dated May 16, 2017.
(Continued)

*Primary Examiner* — Alexander Thomas
(74) *Attorney, Agent, or Firm* — Marshall, Gerstein & Borun LLP

(57) ABSTRACT

A vacuum insulated panel (VIP) and a method of manufacturing a VIP includes a rigid core material having high insulation and low conductivity properties. The rigid core may be made of an inorganic material that effectively mimics a porous silica core material. The core material includes large particles of an inorganic material having a diameter in a range of 10 μm to 50 μm. A portion of these large particles may be ground into small particles having a diameter of less than 1 μm. The small particles are mixed with a portion of the large particles to form a core material which is then mixed with a fiber skeleton and compacted under vacuum along with a fibrous skeleton for structure. The resulting structure provides a porosity ranging from 10 nm to 1 μm in diameter.

19 Claims, 5 Drawing Sheets

(51) Int. Cl.
   *B29K 105/04*       (2006.01)
   *B29K 105/16*       (2006.01)
   *B29L 31/00*        (2006.01)

(56) References Cited

U.S. PATENT DOCUMENTS

| | | |
|---|---|---|
| 4,594,279 A | 6/1986 | Yoneno et al. |
| 4,692,363 A * | 9/1987 | Reiss ................ C04B 30/02 |
| | | 138/149 |
| 5,316,816 A | 5/1994 | Sextl et al. |
| 5,376,449 A | 12/1994 | Harris et al. |
| 6,001,450 A | 12/1999 | Tanimoto et al. |
| 6,221,456 B1 | 4/2001 | Pogorski et al. |
| 2011/0086196 A1 | 4/2011 | Salamon |
| 2013/0052393 A1 | 2/2013 | Hahn et al. |
| 2013/0142983 A1* | 6/2013 | Han ....................... B32B 5/26 |
| | | 428/69 |
| 2015/0209981 A1 | 7/2015 | Baek et al. |

FOREIGN PATENT DOCUMENTS

| | | |
|---|---|---|
| WO | WO-2014184393 A1 | 11/2014 |
| WO | WO-2015182768 A1 | 12/2015 |

OTHER PUBLICATIONS

Written Opinion for International Application No. PCT/US2017/016464, dated May 16, 2017.

\* cited by examiner

ALTERNATIVE CORE MATERIAL BASED VACUUM INSULATED PANELS

FIELD OF THE INVENTION

The present disclosure generally relates to a vacuum insulated panel and method of manufacturing a vacuum insulated panel, and more particularly, to a vacuum insulated panel having a core of inorganic material and a method of manufacturing the core.

BACKGROUND

Vacuum Insulated Panels (VIPs) are one of the most efficient and safest thermal insulation products. Typically, a VIP includes a nearly gas-tight enclosure surrounding a rigid core, from which the air has been evacuated. Conventional insulation products used in buildings, vehicles, refrigerators, and freezers limit energy waste and dissipation of heat by restricting air flow through the core material. The VIP core outperforms other thermal insulation materials, such as hydroflourocarbons and polyurethane, in terms of its thin structure, minimal impact on human health and the environment, and high thermal resistant properties.

Fumed silica and aerogels are commonly used as the core material for VIPs because fumed silica and aerogels have molecular structures that inhibit gas flow by creating rarefied domain, and lower sensitivities to different pressures. In particular, fumed silica and aerogels have porous structures that when compacted under vacuum result in low thermal conductivity and thus, high thermal resistance R-values. Due to the low conductivity and high-insulating core material of fumed silica and aerogels, the VIP is one of the thinnest insulation products on the market.

Fumed silica and aerogels are expensive relative to other organic and inorganic materials used in other insulation products because manufacturing processes that impart a nanoporous and open-cell structure, in which is imparted on fumed silica and aerogel, are significantly cost intensive. However, most insulation products tend to be very thick and bulky to compensate for low R-values inherent in the core materials. Emissions from these preferred insulation products may also be a mechanical irritant and harmful to human health upon inhalation to the lungs or penetration into the eyes. Therefore, a need exists for a core material that is high performing, inexpensive, environmentally friendly, safe, and compliant with American Society for Testing and Materials (ASTM) standards.

SUMMARY

In accordance with one or more aspects, a vacuum insulated panel and a method of manufacturing a vacuum insulated panel in accordance with the teachings described herein may address a need for an inexpensive, high performing, and safe insulating product.

In accordance with a first exemplary aspect, a vacuum insulated panel may include a core having a porosity in a range of approximately 10 nm to approximately 1 µm. The core may include a plurality of large particles of an inorganic material with a diameter in a range of approximately 10 µm to approximately 50 µm and a plurality of small particles of the inorganic material with a diameter in a range of approximately 0.01 µm to approximately 10 µm. At least some of the small particles may attach to at least some of the large particles. A fiber skeleton may be intermixed with the large and small particles. The vacuum insulated panel may further include an envelope having a cavity, wherein the core is disposed within the cavity and vacuum compacted.

In accordance with a second exemplary aspect, a vacuum insulated panel may include a pair of barrier walls and a core sandwiched between the pair of barrier walls. The core may include a core material and a fiber skeleton, wherein the core material is an inorganic material and includes a first class of particles with a diameter in a range of approximately 10 µm to approximately 50 µm and a second class of particles with a diameter in a range of approximately 0.01 µm to approximately 10 µm. The fiber skeleton may be mixed with the core material forming a porous structure, wherein the porous structure includes a plurality of the first class of particles mixed with a plurality of the second class of particles. Each of the plurality of first class particles may be at least partially covered by a portion of the plurality of second class particles.

In accordance with a third exemplary aspect, a method of manufacturing a vacuum insulated panel may include dividing a plurality of large particles of an inorganic material into a first portion and a second portion, wherein each of the large particles has a diameter in a range of approximately 10 µm to approximately 50 µm. Next, the method may include grinding the first portion of large particles into a plurality of small particles, wherein each of the plurality of small particles has a diameter of less than 1 µm. The method may further include mixing the plurality of small particles of the first portion with the plurality of large particles of the second portion to create a core material and mixing a fiber skeleton with the core material to create a core mixture. After mixing, the method may include inserting the core mixture into a cavity of an envelope and compacting the core mixture within the envelop under vacuum.

In further accordance with any one or more of the foregoing first, second, or third aspects, a vacuum insulated panel/method may further include any one or more of the following preferred forms. In a preferred form of the vacuum insulated panel, the inorganic material is at least one of (a)-(g): (a) perlite, (b) pumice, (c) natural gypsum, (d) calcium sulfate hemi hydrate, (e) anhydrite calcium sulfate, (f) calcium sulfate di-hydrate, and (g) wollastonite.

In a preferred form of the vacuum insulated panel, the fiber skeleton is at least one of (a)-(e); (a) mineral fiber, (b) high density glass fiber, (c) mineral oxide fiber, (d) loose microfiber, and (e) woven fiber.

In a preferred form of the vacuum insulated panel, each of the plurality of small particles has a diameter in a range of approximately 0.01 µm to approximately 1 µm.

In a preferred form of the vacuum insulated panel, the envelope is a metallic coated polymer.

In a preferred form of the vacuum insulated panel, each of the plurality of large particles is at least partially covered by a portion of the plurality of small particles.

In a preferred form of the vacuum insulated panel, the core has a core material to fiber skeleton ratio of at least 1:1.

In a preferred form of the vacuum insulated panel, the core consists of the large particles, small particles, and the fiber skeleton.

In a preferred form of the method, grinding the first portion includes grinding the plurality of large particles of the first portion into small particles with a diameter in a range of approximately 0.01 µm to approximately 1 µm.

In a preferred form of the method, compacting the core mixture includes forming a porous structure having a porosity in a range of approximately 10 nm to approximately 1 µm.

In a preferred form of the method, mixing the fiber skeleton with the core material includes mixing a first mass of the core material with a second mass of the fiber skeleton, the first mass being at least equal to the second mass.

DETAILED DESCRIPTION

Figure 1:
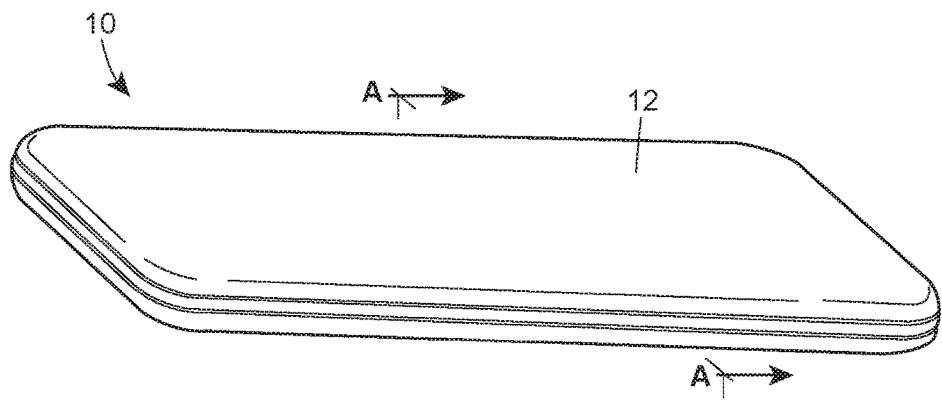
FIG. 1 is a perspective view of a vacuum insulated panel in accordance with the teachings of the present disclosure.
Figure 2:
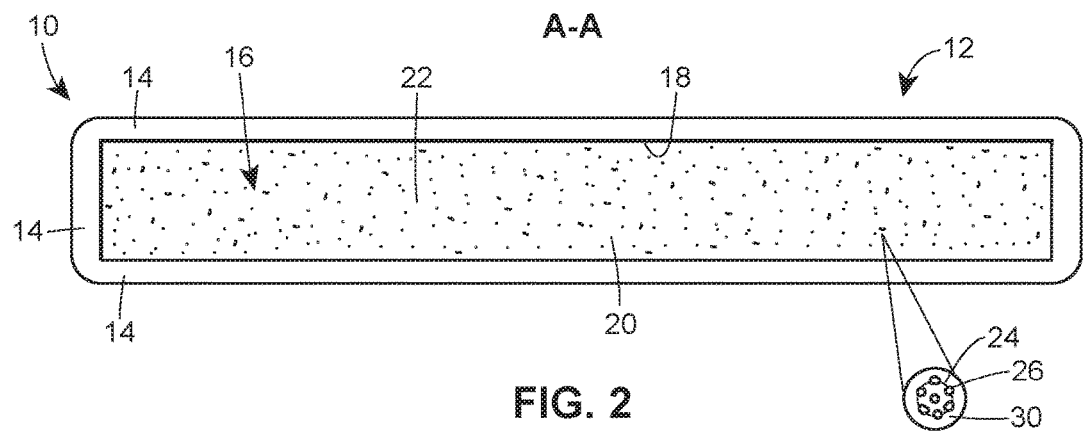
FIG. 2 is a cross-sectional view A-A of the vacuum insulated panel of FIG. 1.

FIG. 1 illustrates a single rectangular vacuum insulated panel (VIP) 10. The VIP 10 has an outer envelope 12 that at least partly surrounds, encloses, envelops, and/or contains an inner rigid core 16 (FIG. 2). As illustrated in a cross-sectional view A-A of FIG. 2, the envelope 12 provides barrier walls 14 which surround the rigid core 16 that is disposed within a cavity 18 (e.g., space, recess, opening, pocket, etc.) of the envelope 12. The rigid core 16 is a vacuum compacted mixture of inorganic core material 20, which may be powder, and a fiber skeleton 22 having a plurality of separate fibers. The core material 20 is made up of a plurality of large particles 24 and a plurality of small particles 26 of the same inorganic material. Each of the large particles 24 has a diameter in a range of approximately 10 µm to approximately 50 µm and each of the small particles 26 has a diameter in a range of approximately 0.01 µm to approximately 10 µm. At least some of the small particles 26 self-assembly or otherwise attach to at least one of the large particles 24. When compacted under vacuum, the core 16 has a porosity in a range of approximately 10 nm to approximately 1 µm.

Figure 3:
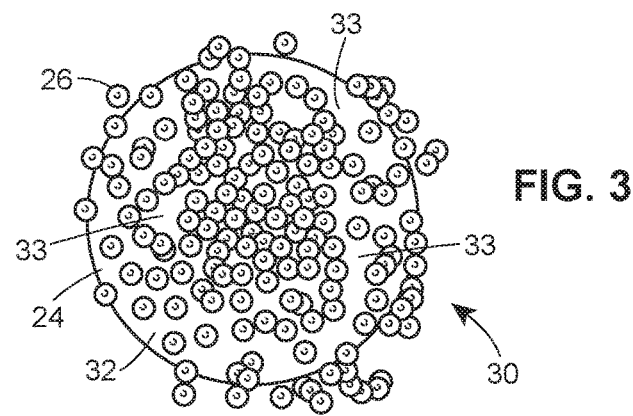
FIG. 3 is an isolated particle arrangement taken from detail B of FIG. 2.

A microscopic view of an isolated particle arrangement 30 of the core material 20 is illustrated in FIG. 3. The particle arrangement 30 of FIG. 3 includes a plurality of small ball-shaped particles 26 attached to an outer surface 32 of a large ball-shaped particle 24. When compacted under vacuum, the small particles 26 aggregate on the outer surface 32 of the large particle 24, forming an irregularly shaped particle arrangement 30 having a multitude of tortuous channels 33 (e.g., pathways, grooves, slots, recesses, etc.). Each of the small particles 26 has a diameter less than 10 µm, and preferably has a diameter within a range of approximately 0.01 µm to approximately 1 µm.

Figure 4:
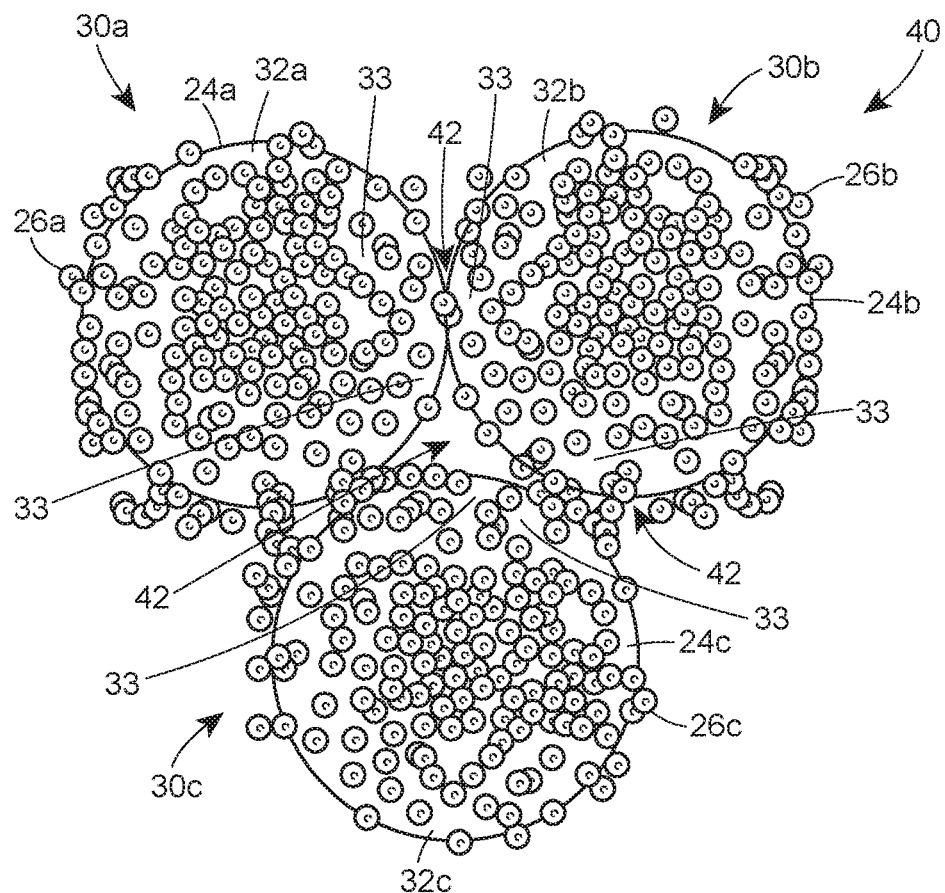
FIG. 4 is an isolated porous core material structure of a core of FIG. 2.

The core 16, when assembled, includes a plurality of particle arrangements 30 compacted together such that the many channels 33 collectively provide a porous structure that substantially interferes with the mean free path of air molecules therethrough. As such, the core 16 possesses a very low thermal conductivity property (e.g., in a range of approximately 0.005 W/m*K (0.04 BTU*in/(hr*ft$^{2*}$F)) to approximately 0.05 W/m*K (0.35 BTU*in/(hr*ft$^{2*}$F))) and a very high R-value (e.g., in a range of approximately 3 hr*ft$^{2*}$F/BTU to approximately 28 hr*ft$^{2*}$F/BTU). In FIG. 4, three particle arrangements 30a, 30b, 30c are closely packed together to form an exemplary sample of a portion of a porous core material structure 40. The core material structure 40 intermixed with the fiber skeleton 22 (not illustrated in FIG. 4) forms a porous structure of the rigid core 16 having preferred porosity of 10 nm to 1 µm. FIG. 4 partially illustrates the porous structure of the rigid core 16. In a first particle arrangement 30a, some of the small particles 26a attached to the outer surface 32a of the large particle 24a overlap with some small particles 26b, 26c of second and third particle arrangements 30b, 30c and vice versa. For example, some of the small particles 26a reside within channels 33 between small particles 26b and 26c and vice versa. Thus, in this configuration, it can be said that some of the small particles 26a, 26b, 26c become interleaved with the other small particles in this configuration. A void 42 formed between particle arrangements 30a, 30b, 30c may permit air flow. When vacuum compacted, the voids 42 between particles 24, 26 become much smaller, minimizing space for air flow. As the number and size of voids 42 decrease, thermal conductivity of the core material decreases, and thermal resistance (R-value) of the core material increases.

The self-assembly and therefore the porosity of the porous core material structure 40 is due in part to the fiber skeleton 22. The fiber skeleton 22 provides structure to the core material and allows the particles 24, 26 to self-assemble. Without a fiber skeleton 22, the ground small particles 26 would not self-assemble on the outer surfaces 32 of the large particles 24, as illustrated in FIGS. 3-4 and described herein, and would instead migrate toward a side of the envelope closest to the vacuum.

The particles 24, 26 in FIGS. 3-4 are generally illustrated as being spherical, but may be oblong, egg-shaped, oval, or of another round shape, and may include surface deformities and imperfections. In other examples, the core material 20 may have a polyhedron shape or another sharper structural shape, including stick-like, cubicle, or other non-spherical, non-round or partially round shapes. The envelope 12 may be a pliable material having a metallic coating. For example, the envelope may be a polymer having aluminum foil coating or a metallized film. The core material 20, the fiber skeleton 22, and the core mixture of the core 16 is described in more detail below.

Figure 5:
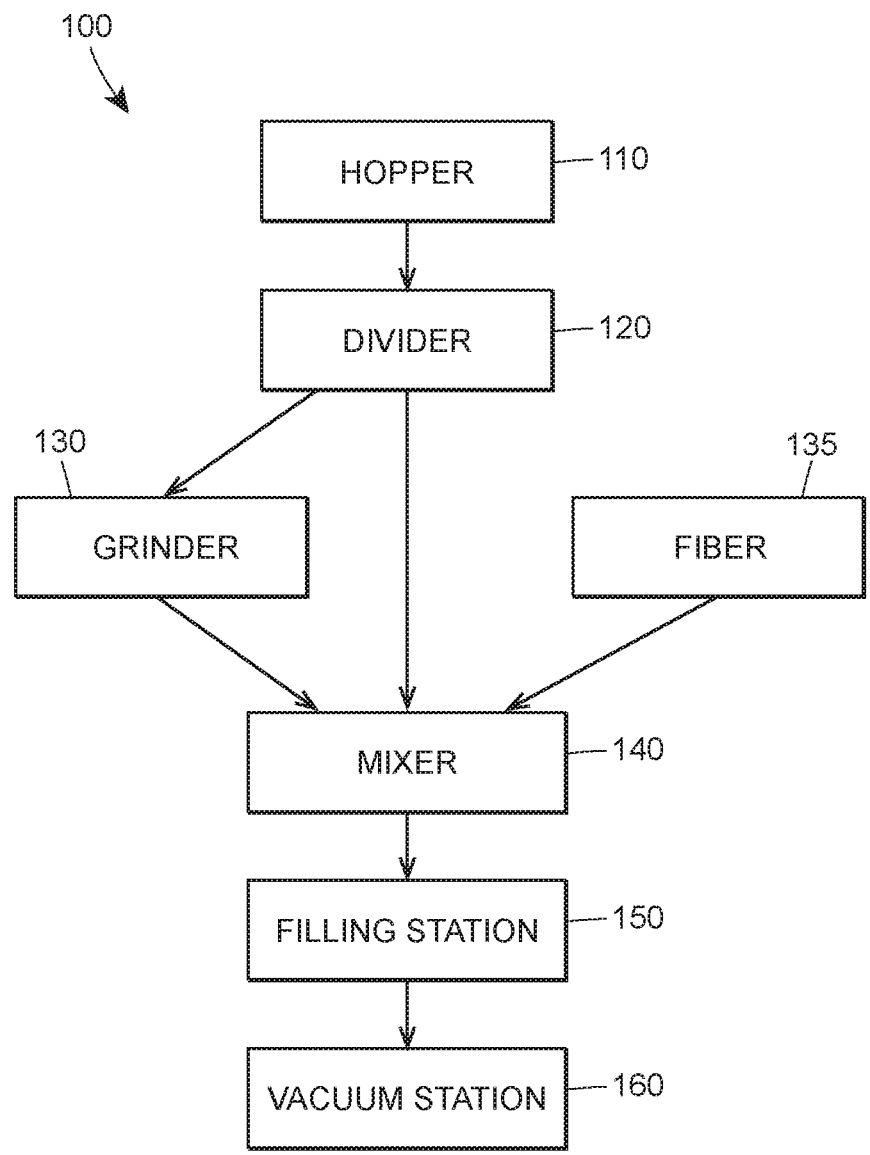
FIG. 5 is a block diagram of a process of manufacturing a core material and a vacuum insulated panel in accordance with the teachings of the present disclosure.

An exemplary method of manufacturing the rigid core 16 and a VIP 10 is illustrated in the block diagram 100 of FIG. 5. An inorganic material may have a plurality of large particles, wherein each of the large particles has a diameter in a range of approximately 10 µm to approximately 50 µm. The inorganic material, which may be in powder form, is funneled into a hopper at block 110 and is then divided at block 120 into a first class of particles and a second class of particles. The divider at block 120 may include a tube or conveying means that separates a predetermined amount of the inorganic material into first and second classes and directs the first class to a grinder at block 130. The grinder may be a Superfine air vortex mill capable of grinding the first class of particles into smaller particles having a diameter of less than 10 µm. In a preferred method, the grinder reduces the first class of particles to a diameter in the range of approximately 0.01 µm to approximately 1 µm. While the first class is processed at block 130, the second class of particles may be isolated from the first class and does not undergo any processing. The divider block 120 may include a conveyor belt or other transporting means that leads the second class toward a mixer at block 140.

After the first class is ground to a preferred diameter size, the first and second classes of particles are mixed together by the mixer at block 140. Block 140 may include a mixing device such as a funnel mixer, an auger mixer, a paddle mixer, etc. that collects and mixes the first and second classes with a generally uniform dispersion to form a core material. A plurality of fibers may then also be added from a supply at block 135 to the first and second classes in the mixer of block 140, such that the mixer intermixes the core material and the fiber skeleton together in a generally uniform dispersion to form a core mixture. From the mixer at block 140, the core mixture can be conveyed or otherwise transported to a filling station at block 150. At block 150, the core mixture is inserted into a cavity of an envelope at a filling station. At the filling station, an empty envelope is positioned below a chute that dispenses a predetermined amount of the core mixture into the cavity of the envelope. A filled envelope is then transported to a vacuum station at block 160 where the envelope is evacuated under a vacuum such that the core mixture is compacted. Then, the envelope can be sealed to form a VIP 10. On compacting under vacuum, a desired porosity range of 10 nm to approximately 1 μm is achieved. In some versions, a vacuum pressure in the range of approximately 1 Pa (0.0003 in*Hg) to approximately 100,000 Pa (30 in*Hg) can be applied to evacuate the envelope and compact the core material. In one version, a vacuum pressure in the range of approximately 170 Pa (0.02 in*Hg) to approximately 110 Pa (0.033 in*Hg) can be applied to evacuate the envelope and compact the core material.

The method as illustrated in the block diagram of FIG. 5 is merely an exemplary method of manufacturing the core of the VIP 10. Each block may include automated devices to perform each step of the method. Alternatively, some of the steps of the method may be performed manually. Further, the method may include repeated steps of mixing and grinding before proceeding to the next block. For example, the fiber skeleton may be added to the core material after block 140 but before block 150.

The core material 20 (FIG. 2) may be any inorganic material that is capable of being ground, or otherwise reduced, to approximately 0.01 μm to approximately 1 μm in diameter, intermixed with the fiber skeleton 22 and then vacuum compacted to form a rigid core 16. In some versions, the core material 20 includes only one of the following inorganic material options: perlite, pumice, natural gypsum, calcium sulfate hemi hydrate, anhydrite calcium sulfate, calcium sulfate di-hydrate, and wollastonite. Other materials, including organic materials, may also be used.

The fiber skeleton 22 may include, for example, mineral fiber, high density glass fiber, mineral oxide fiber, loose microfiber, and woven fiber. In a preferred core material mixture, the core material 20 is not a mixture of different inorganic materials, but is a single inorganic material such that the core material 20 possesses a homogeneous composition. While inorganic materials have been disclosed as the preferred materials for the core material, other versions within the scope of the present disclosure can include organic materials suitable for the intended purpose. The fiber skeleton may be a single material or a combination of different fiber materials.

Figure 6:
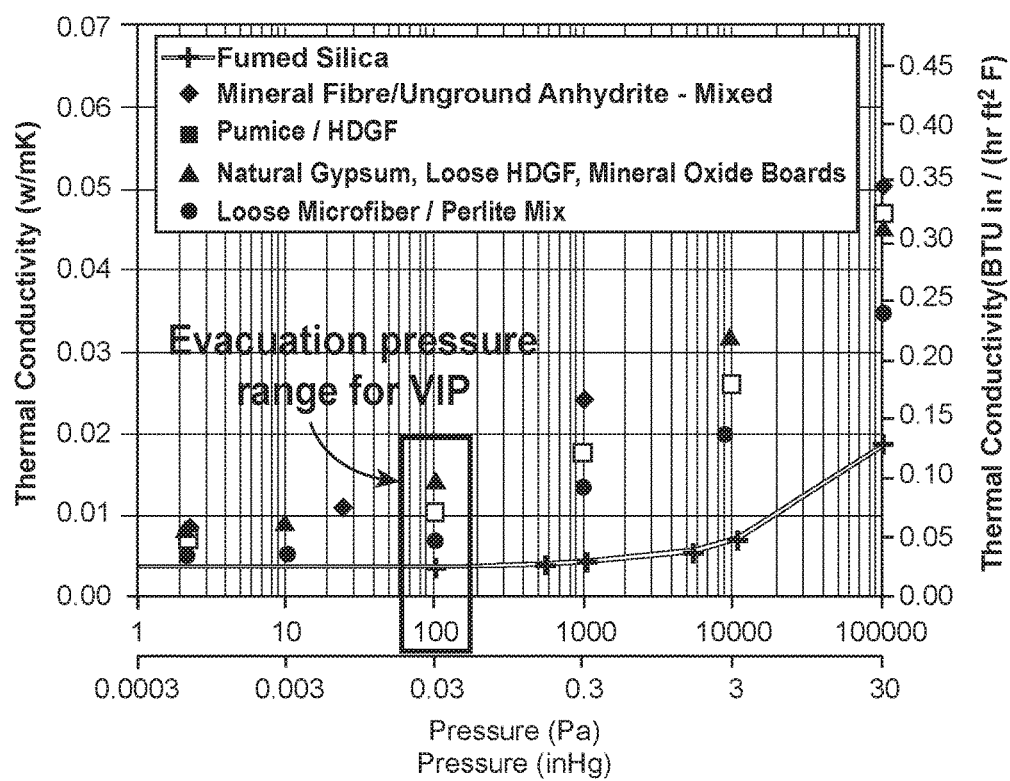
FIG. 6 is a graph plotting experimental results illustrating the performance of a vacuum insulated panel prepared with different core mixtures in accordance with the teachings of the present disclosure.

To determine a combination yielding highest R-values, multiple combinations of core material 20 and fiber skeleton 22 materials were tested. FIG. 6 plots the performance of four trial mixtures of core material 20 and fiber skeleton 22 materials compared to a conventional fumed silica core. The four trial mixtures include (1) a mineral fiber and unground anhydrite mixture, (2) a pumice and high-density glass fiber mixture, (3) a natural gypsum and loose high density glass fiber and mineral oxide fiber mixture, and (4) a perlite and loose microfiber mixture. Using a vacuum guarded hot plate apparatus, the thermal conductivity of each core mixture was measured at atmospheric pressure and at different levels of evacuation. Surprisingly, the four trial mixtures of inorganic materials performed similarly to that of fumed silica. The mineral wool fiber and unground anhydrite mixture provided highest values of thermal conductivity at most tested evacuation pressures. Among the mixtures, the highest performing incorporated pumice, natural gypsum, and perlite powders mixed with microfibers. The perlite and loose microfiber mixture performed closest to that of a fumed silica core material with a thermal conductivity value of approximately 0.005 to 0.006 W/m*K (0.025 BTU*in/(hr*ft$^2$*F)) at 2 Pa (0.0006 in*Hg) evacuation pressure.

The four trial mixtures plotted on the graph of FIG. 6 were selected after performing a series of tests. For example, each inorganic material of a test sample was mixed with a fiber skeleton to determine a desirable powder (core material) to fiber ratio. The highest performing mixtures provided a core material to fiber skeleton ratio of 1:1 or lower. Additionally, a desired density of each core material and fiber skeleton material was also determined. As illustrated in the tables below, each core material 20 was mixed with a single or multiple fiber skeleton 22 materials.

The following tables include mixtures incorporating high-performing powders and fiber skeleton materials to reach a desired thermal conductivity. Certain properties, such as weight percent of mixture, mass ratio of powder to fiber, and density of the core material were tested.

TABLE 1

Mixtures Incorporating Natural Gypsum

| Material Description | Powder/Fiber | Quantity (g) | Wt. % of mixture | Density (kg/m$^3$) | Mass Ratio Powder/Fiber |
|---|---|---|---|---|---|
| Layered Mix of Natural Gypsum and High Density Glass Fiber Boards | Ground Natural Gypsum Powder | 503.4 | 77.1 | 265.3 | 3.4 |
| | High Density Glass Fiber Boards | 149.8 | 22.9 | 79.0 | |
| | TOTAL | 653.2 | 100 | 344.2 | |
| Layered Mix of Natural Gypsum and Mineral Oxide Boards | Ground Natural Gypsum Powder | 703.8 | 83.1 | 370.9 | 4.9 |
| | Mineral Oxide Boards | 143.2 | 16.9 | 75.5 | |
| | TOTAL | 847 | 100 | 446.4 | |
| Natural Gypsum and Loose HDGF I | Ground Natural Gypsum Powder | 284.6 | 50.0 | 150.0 | 1.0 |
| | Loose High Density Glass Fiber | 284.6 | 50.0 | 150.0 | |
| | TOTAL | 509.2 | 100 | 300.0 | |

TABLE 1-continued

Mixtures Incorporating Natural Gypsum

| Material Description | Powder/Fiber | Quantity (g) | Wt. % of mixture | Density (kg/m³) | Mass Ratio Powder/Fiber |
|---|---|---|---|---|---|
| Natural Gypsum and Loose HDGF II | Ground Natural Gypsum Powder | 284.6 | 42.9 | 150.0 | 0.7 |
| | Loose High Density Glass Fiber | 379.5 | 57.1 | 200.0 | |
| | TOTAL | 664.1 | 100 | 350.0 | |
| Natural Gypsum, Loose HDGF, Mineral Oxide Boards | Ground Natural Gypsum Powder | 142.3 | 29.8 | 75.0 | 0.4 |
| | Loose High Density Glass Fiber | 189.75 | 39.8 | 100.0 | |
| | Mineral Oxide Boards | 144.739 | 30.4 | 76.3 | |
| | TOTAL | 476.789 | 100 | 251.3 | |

In Table 1, natural gypsum was mixed with different fiber skeleton materials to determine a high performing powder to fiber ratio with optimal total mixture density. The density of the fiber-powder mixture was calculated on the basis of the weight of the mixture and the known volume of the evacuation box used for testing. The ideal density for an optimal VIP core is 260±80 kg/m³, and the fiber-powder mixtures incorporating natural gypsum in Table 1, for example, fell within or came close to the ideal density range.

Figure 7:
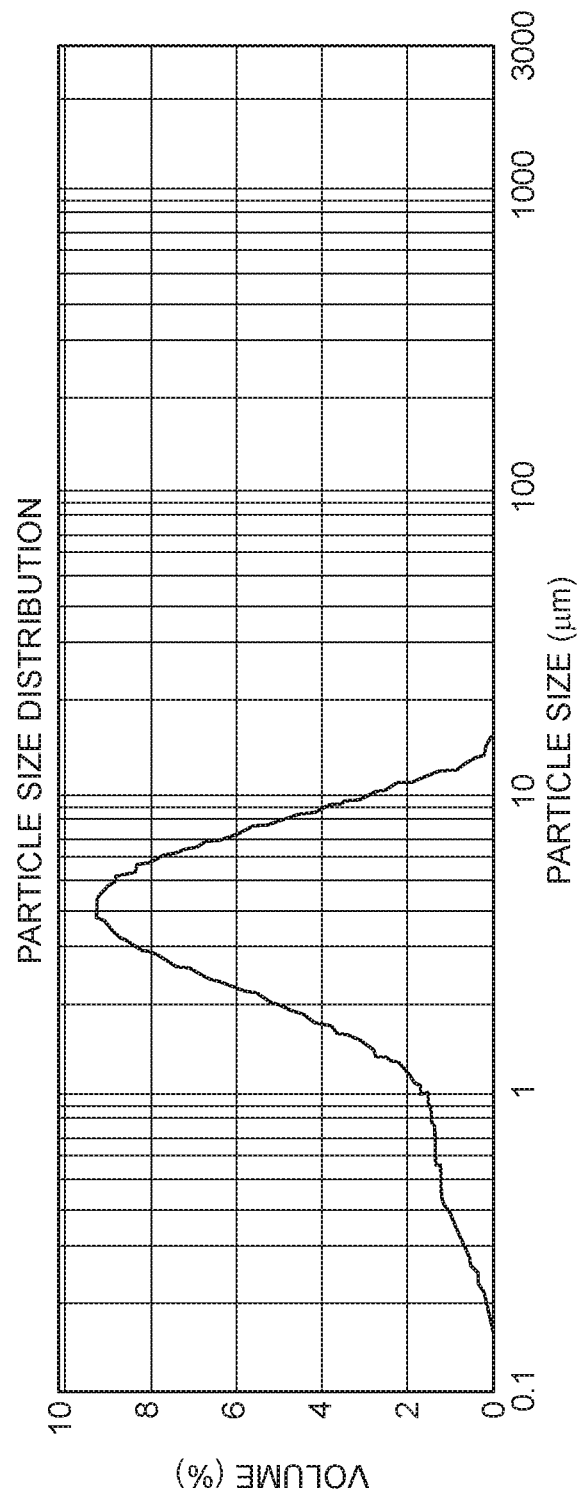
FIG. 7 is a graph plotting particle size distribution of perlite powder.

Particle size and how it may affect porosity of the core material structures was also tested. For example, powder materials show a loss of thermal insulating capacity with increase of pressure. The rate at which the powder material loses thermal insulating capacity depends on the particle size distribution of the powder. FIG. 7 is a data plot of particle size distribution of perlite and illustrates a percent volume of perlite particles as a function of particle size, overall density, and pore size distribution. An ideal VIP core has a nanoporous structure having a wide range of pore sizes. The particle distribution in FIG. 7, for example, illustrates how the core material decreased in particle size from 10 to 50 µm to less than 7.5 µm. In this case, the distribution does not include a big particle size and provides varying porosity.

The VIP 10 and the method of manufacturing the VIP 10 as disclosed herein provide a less expensive and safer alternative core to fumed silica and aerogel. The VIP 10 mimics the structural properties of a fumed silica core/aerogel core material without using fumed silica and aerogel. Instead, a portion of the disclosed material may be ground to a diameter of less than 1 µm to provide a core material having low thermal conductivity and a high R-value. For example, gypsum in its natural state does not have the same structural properties (i.e. porosity) as fumed silica. After processing the gypsum according to the method described herein, gypsum may be ground into a desired particle size to provide a core material having a porosity ranging from 10 nm to 1 µm in diameter. Thus, it can be appreciated that the subject matter of the present disclosure provides a technical advantage over conventional VIPs in that more user-friendly materials can be used to produce cost-effective VIPs with comparable insulating properties. This wholly eliminates potential concerns related to fumed silica and/or aerogel exposure.

While certain representative versions of core materials and VIPs have been described herein for purposes of illustrating the invention, it will be apparent to those skilled in the art that various changes in the devices and methods disclosed may be made without departing from the spirit and scope of the invention, which is defined by the following claims and is not limited in any manner by the foregoing description.

What is claimed is:

1. A vacuum insulated panel comprising:
   a core having a porosity defined by pores having a size in a range of approximately 10 nm to approximately 1 µm, wherein the core comprises:
   a plurality of large particles of an inorganic material with a diameter in a range of greater than 10 µm to approximately 50 µm;
   a plurality of small particles of the inorganic material with a diameter in a range of approximately 0.01 µm to less than 10 µm, at least some of the small particles attached to at least some of the large particles;
   a plurality of fibers intermixed with the large and small particles; and
   an envelope having a cavity, wherein the core is disposed within the cavity and vacuum compacted.

2. The vacuum insulated panel of claim 1, wherein the inorganic material is at least one of (a)-(g); (a) perlite, (b) pumice, (c) natural gypsum, (d) calcium sulfate hemi hydrate, (e) anhydrite calcium sulfate, (f) calcium sulfate di-hydrate, and (g) wollastonite.

3. The vacuum insulated panel of claim 1, wherein the plurality of fibers are at least one of (a)-(e): (a) mineral fiber, (b) high density glass fiber, (c) mineral oxide fiber, (d) loose microfiber, and (e) woven fiber.

4. The vacuum insulated panel of claim 1, wherein each of the plurality of small particles has a diameter in a range of approximately 0.01 µm to approximately 1 µm.

5. The vacuum insulated panel of claim 1, wherein the envelope is a metallic coated polymer.

6. The vacuum insulated panel of claim 1, wherein each of the plurality of large particles is at least partially covered by a portion of the plurality of small particles.

7. The vacuum insulated panel of claim 1, wherein the core has a core material to fibers weight ratio of at least 1:1.

8. The vacuum insulated panel of claim 1, wherein the core consists of the large particles, small particles, and the plurality of fibers.

9. A vacuum insulated panel comprising:
   a pair of barrier walls;
   a core sandwiched between the pair of barrier walls, the core including a core material and a plurality of fibers mixed with the core material forming a porous structure;
   wherein the core material is an inorganic material and includes a first class of particles with a diameter in a range of greater than 10 µm to approximately 50 µm and a second class of particles with a diameter in a range of approximately 0.01 µm to less than 10 µm;
   wherein the porous structure includes a plurality of the first class of particles mixed with a plurality of the second class of particles, wherein each of the plurality of first class particles is at least partially covered by a portion of the plurality of second class particles;

wherein the porous structure has a porosity defined by pores having a size in a range of approximately 10 nm to approximately 1 μm when compacted under vacuum.

10. The vacuum insulated panel of claim 9, wherein the inorganic material is at least one of (a)-(g); (a) perlite, (b) pumice, (c) natural gypsum, (d) calcium sulfate hemi hydrate, (e) anhydrite calcium sulfate, (f) calcium sulfate di-hydrate, and (g) wollastonite.

11. The vacuum insulated panel of claim 9, wherein the plurality of fibers are at least one of (a)-(e); (a) mineral fiber, (b) high density glass fiber, (c) mineral oxide fiber, (d) loose microfiber, and (e) woven fiber.

12. The vacuum insulated panel of claim 9, wherein the pair of barrier walls is metallic coated polymer.

13. The vacuum insulated panel of claim 9, wherein the porous structure includes a core material to fibers weight ratio of at least 1:1.

14. The vacuum insulated panel of claim 9, wherein each of the small particles has a diameter in a range of approximately 0.01 μm to approximately 1 μm.

15. The vacuum insulated panel of claim 9, wherein the core consists of the large particles, small particles, and the plurality of fibers.

16. A vacuum insulated panel comprising:
a core having a porosity defined by pores having a size in a range of approximately 10 nm to approximately 1 μm, wherein the core comprises:
a plurality of large particles of an inorganic material with a diameter in a range of approximately 10 μm to approximately 50 μm;
a plurality of small particles of the inorganic material with a diameter in a range of approximately 0.01 μm to approximately 1 μm, at least some of the small particles attached to at least some of the large particles;
a plurality of fibers intermixed with the large and small particles; and
an envelope having a cavity, wherein the core is disposed within the cavity and vacuum compacted.

17. The vacuum insulated panel of claim 16, wherein the envelope is a metallic coated polymer.

18. The vacuum insulated panel ot claim 16, wherein each of the plurality of large particles is at least partially covered by a portion of the plurality of small particles.

19. The vacuum insulated panel of claim 16, wherein the core has a core material to fibers weight ratio of at least 1:1.

* * * * *